US009448545B2

(12) United States Patent
Iwashita et al.

(10) Patent No.: US 9,448,545 B2
(45) Date of Patent: Sep. 20, 2016

(54) SERVO CONTROL DEVICE FOR PERFORMING CORRECTION BASED ON AMOUNT OF STRETCH OR CONTRACTION OF BALL SCREW

(71) Applicant: FANUC CORPORATION, Minamitsuru-gun, Yamanashi (JP)

(72) Inventors: Yasusuke Iwashita, Yamanashi (JP); Kenichi Takayama, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 508 days.

(21) Appl. No.: 14/065,925

(22) Filed: Oct. 29, 2013

(65) Prior Publication Data

US 2014/0121818 A1    May 1, 2014

(30) Foreign Application Priority Data

Oct. 30, 2012    (JP) .................. 2012-239048

(51) Int. Cl.
G05B 19/40       (2006.01)
G05B 13/02       (2006.01)
G05B 19/404      (2006.01)

(52) U.S. Cl.
CPC ............ *G05B 13/024* (2013.01); *G05B 19/404* (2013.01)

(58) Field of Classification Search
CPC .................................................. G05B 13/024
USPC ......................................... 318/685, 671, 560
See application file for complete search history.

(56) References Cited

U.S. PATENT DOCUMENTS 7,847,503 B2 * 12/2010 Ooga .................... B25J 9/1628
318/568.11

FOREIGN PATENT DOCUMENTS

| DE | 1152870 B     | 8/1963 |
| JP | 4240045 A     | 8/1992 |
| JP | 05-208342 A   | 8/1993 |
| JP | 2002-023852 A | 1/2002 |
| JP | 2003-058213 A | 2/2003 |

OTHER PUBLICATIONS

Office Action mailed Jun. 3, 2014, corresponds to Japanese patent application No. 2012-239048.
Pajor, M; u.a.: Supervising and compensation of thermal error of CNC feed ball screw, DIAGNOSTYKA, vol. 14, No. 2, 2013, S.37-42.

* cited by examiner

*Primary Examiner* — David S Luo
(74) *Attorney, Agent, or Firm* — Hauptman Ham, LLP

(57) ABSTRACT

A servo control device in the present invention corrects a position command to a feed axis, so as to compensate for an amount of stretch or contraction of a ball screw during operation, by taking into account an influence of tension applied to the ball screw. The amount of stretch or contraction of the ball screw is calculated, based on the tension acting on the ball screw on the side farther from the servo motor, a distance between two fixed units supporting the ball screw at its opposite ends, a distance from the fixed unit situated closer to the servo motor to a moving body, and a torque command to the servo motor. An amount of position correction of the feed axis is calculated, based on the calculated amount of stretch or contraction of the ball screw.

6 Claims, 5 Drawing Sheets

SERVO CONTROL DEVICE FOR PERFORMING CORRECTION BASED ON AMOUNT OF STRETCH OR CONTRACTION OF BALL SCREW

RELATED APPLICATIONS

The present application is based on and claims priority to Japanese Application Number 2012-239048, filed Oct. 30, 2012, the disclosure of which is hereby incorporated by reference herein in its entirety.

BACKGROUND OF THE INVENTION

1. Field of the Invention

The present invention relates to a servo control device for controlling a feed axis which converts rotational motion of a servo motor to linear motion of a moving body by way of a ball screw.

2. Description of the Related Art

A control device which can correct an error in positioning of a feed axis in the form of a ball screw has been known (see JP-B-4867105, JP-B-4503148, and JP-B-3292958). Such an error can be attributed to various factors. For example, JP-B-4867105 discloses a control device that corrects an error resulting from elastic deformation of an elastic element in a power transmission mechanism when a moving body is moved at a high speed.

There is a need for a servo control device for controlling a feed axis which converts rotational motion of a servo motor into linear motion of a moving body by way of a ball screw, the servo control device allowing an error in positioning of a feed axis to be reduced or prevented.

SUMMARY OF THE INVENTION

According to a first aspect of the present application, a servo control device for controlling a feed axis which converts rotational motion of a servo motor into linear motion of a moving body by way of a ball screw, wherein the ball screw is supported at opposite ends thereof by a first fixed unit arranged at one end of the ball screw closer to the servo motor, and by a second fixed unit arranged at the other end of the ball screw, respectively, the servo control device comprising: a position command generating unit for generating a position command associated with a position of the feed axis; a torque command generating unit for generating a torque command for the servo motor; a thermal displacement amount calculating unit for calculating an amount of thermal displacement of the ball screw; a tension calculating unit for calculating tension acting on the second fixed unit, based on a distance from the first fixed unit to the second fixed unit, a distance from the first fixed unit to the moving body, the amount of thermal displacement calculated by the thermal displacement amount calculating unit, and the torque command generated by the torque command generating unit; a stretch/contraction amount calculating unit for calculating an amount of stretch or contraction of the ball screw during operation of the servo motor, based on the tension calculated by the tension calculating unit, the distance from the first fixed unit to the second fixed unit, the distance from the first fixed unit to the moving body, and the torque command generated by the torque command generating unit; and a position correction amount calculating unit for calculating an amount of position correction adapted to correct the position command associated with a position of the feed axis, based on the amount of stretch or contraction calculated by the stretch/contraction amount calculating unit, is provided.

According to a second aspect of the present application, the servo control device according to the first aspect further comprises a judging unit for determining whether the tension calculated by the tension calculating unit acts in a stretching direction that stretches the ball screw, or in a contracting direction that contracts the ball screw, wherein the stretch/contraction amount calculating unit further comprises: a first stretch/contraction amount calculating unit for calculating an amount of stretch of the ball screw, based on the distance from the first fixed unit to the moving body, the distance from the first fixed unit to the second fixed unit, and the torque command generated by the torque command generating unit, when the judging unit determines that the tension acts in the stretching direction; and a second stretch/contraction amount calculating unit for calculating an amount of contraction of the ball screw, based on the distance from the first fixed unit to the moving body, and the torque command generated by the torque command generating unit, when the judging unit determines that the tension acts in the contracting direction.

According to a third aspect of the present application, in the servo control device according to the second aspect, the first stretch/contraction amount calculating unit is configured to calculate the amount of stretch of the ball screw by multiplying, with a predetermined constant, a product of: the distance from the first fixed unit to the moving body; a distance from the first fixed unit to the second fixed unit; an added distance obtained by adding a value of the amount of thermal displacement calculated by the thermal displacement amount calculating unit to an entire length of the ball screw at an ordinary temperature; and the torque command generated by the torque command generating unit.

According to a fourth aspect of the present application, in the servo control device according to the second or third aspect, the second stretch/contraction amount calculating unit is configured to calculate the amount of contraction of the ball screw by multiplying, with a predetermined constant, a product of: the distance from the first fixed unit to the moving body; and the torque command generated by the torque command generating unit.

According to a fifth aspect of the present application, in the servo control device according to any of the first to fourth aspects, the distance from the first fixed unit to the second fixed unit is greater than an entire length of the ball screw at an ordinary temperature, wherein the ball screw is fixed by the first fixed unit and the second fixed unit such that the ball screw is deformable in a direction that stretches the ball screw, while the ball screw is not deformable in a direction that contracts the ball screw.

According to a sixth aspect of the present application, in the servo control device according to any of the first to fifth aspects, the thermal displacement amount calculating unit is configured to calculate the amount of thermal displacement of the ball screw, based on an average speed during a unit time.

These and other objects, features and advantages of the present invention will become more apparent in light of the detailed description of exemplary embodiments thereof as illustrated in the accompanying drawings.

DETAILED DESCRIPTION OF THE INVENTION

Embodiments of the present invention will be described with reference to the accompanying drawings. Constituent elements of the illustrated embodiment may be modified in size in relation to one another for better understanding of the present invention.

Figure 4:
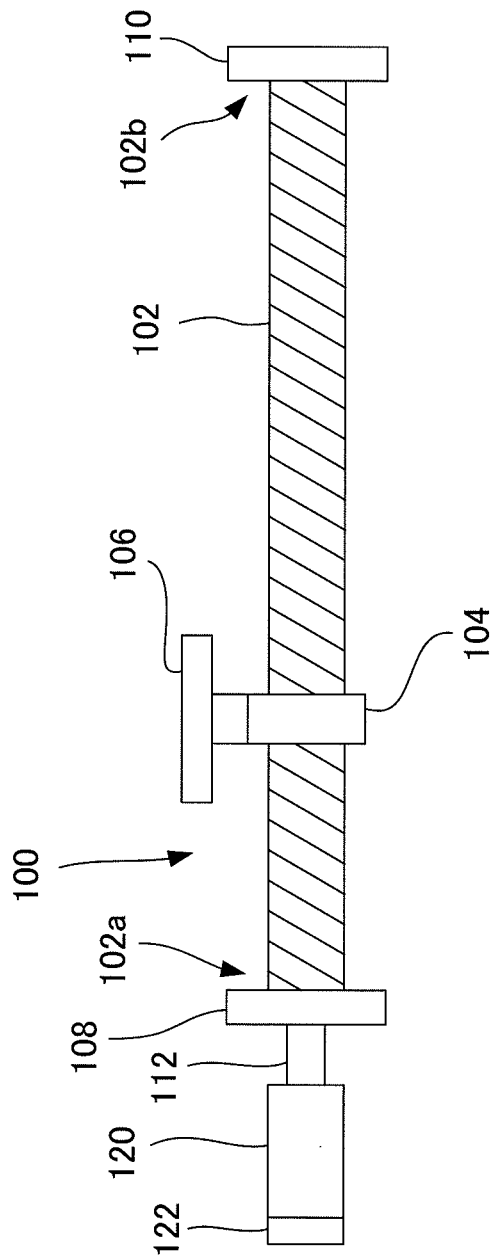
FIG. 4 illustrates an exemplary configuration of a ball screw to which the present invention can be applied.

FIG. 4 illustrates an exemplary configuration of a ball screw 100 to which the present invention can be applied. The ball screw 100 includes a screw axis 102 formed with a threaded groove on an outer circumferential surface thereof, and a nut 104 formed with an internal thread on an inner circumferential surface thereof. The female screw of the nut 104 is fitted into the threaded groove of the screw axis 102 via balls (not shown). The nut 104 is fixedly provided with a table 106, on which, for example, a workpiece (not shown) can be placed, so that the nut 104 and the table 106 can be moved together. The table 106 is one example of a moving body moved by the ball screw 100.

The screw axis 102 of the ball screw 100 is provided with a first bracket 108 and a second bracket 110 spaced apart from each other at opposite ends 102a and 102b of the screw axis 102, respectively. The first bracket 108 is one example of a first fixed unit, and the second bracket 110 is one example of a second fixed unit. The screw axis 102 is rotatably supported by bearings (not shown) provided inside the first bracket 108 and the second bracket 110. Specifically, the first bracket 108 supports the screw axis 102 of the ball screw 100 such that the ball screw 100 is immovable in its longitudinal direction, while the screw axis 102 is rotatable around an axis extending in the longitudinal direction. The second bracket 110 supports the screw axis 102 of the ball screw 100 such that the ball screw 100 is non-contractable in the longitudinal direction, but is stretchable in the longitudinal direction, while the screw axis 102 is rotatable around the axis extending in the longitudinal direction. To the first bracket 108, a servo motor 120 is connected via a coupling 112. The servo motor 120 includes an encoder 122 for detecting information on an operational condition of the servo motor 120, such as a rotational position and a rotational speed.

The servo motor 120 is configured to rotate in response to a command signal generated by a servo control device 10, which will be further described below. Rotational motion of the servo motor 120 is transmitted to the screw axis 102 of the ball screw 100 via the coupling 112. Hence, as the servo motor 120 rotates, the screw axis 102 of the ball screw 100 correspondingly rotates at a predetermined reduction ratio. Corresponding to the rotational motion of the screw axis 102, the nut 104 reciprocates together with the table 106 in the longitudinal direction of the screw axis 102 over a region between the first bracket 108 and the second bracket 110. In this way, the screw axis 102 of the ball screw 100 and the nut 104 function as a feed axis that converts rotational motion of the servo motor 120 into linear motion of the table 106 along the screw axis 102.

The ball screw 100 is subject to thermal expansion due to frictional heat generated between the nut 104 and the screw axis 102 when the nut 104 is in linear motion relative to the screw axis 102. Such thermal expansion of the ball screw 100 could result in deteriorated accuracy in positioning of the feed axis in the ball screw 100. Thus, pretension may be sometimes applied to the ball screw 100, in order to ensure that the ball screw 100 is held in a state where the ball screw 100 is stretched.

Figure 5:
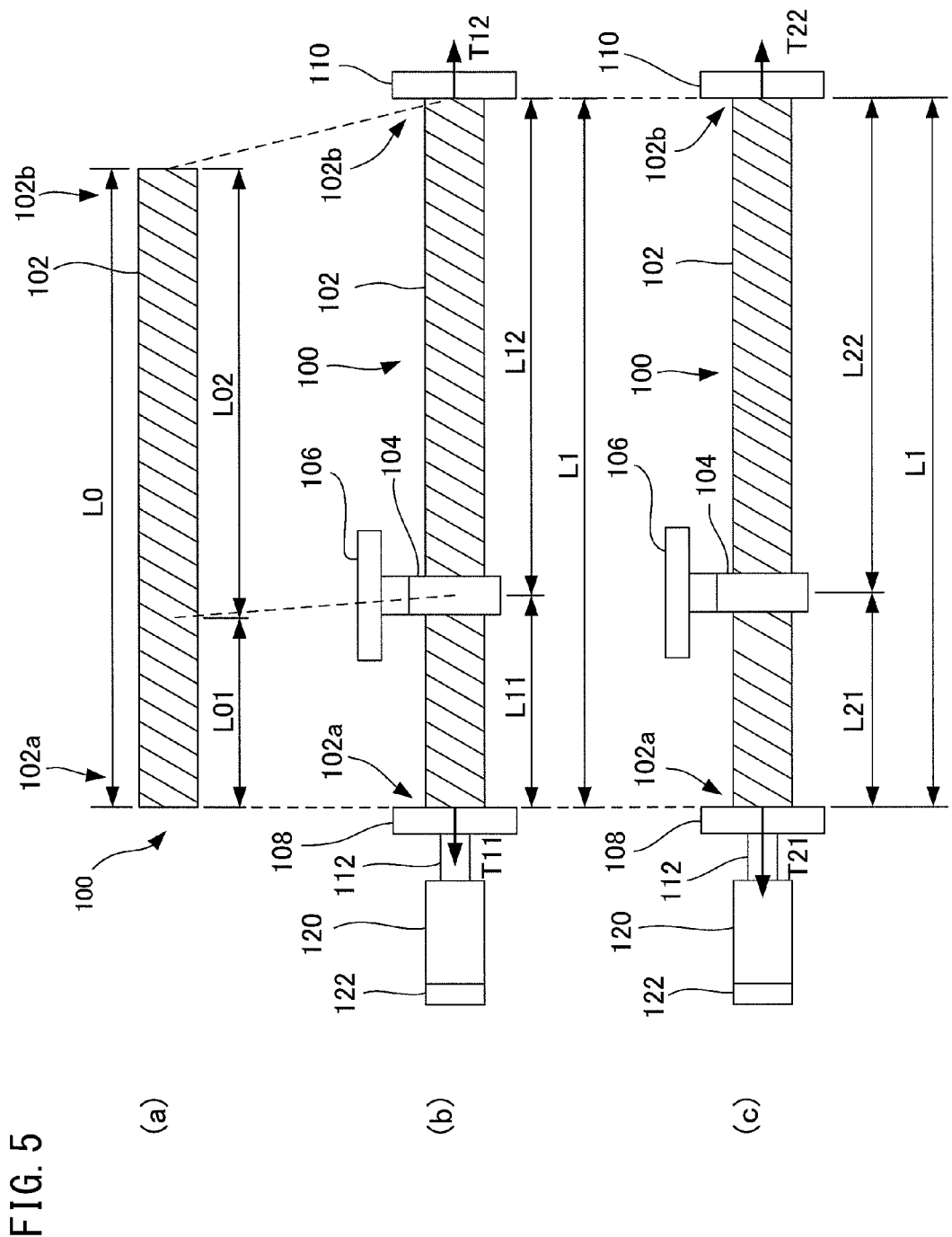
FIG. 5 is a schematic view to explain the ball screw in various states.

FIG. 5 is a schematic view to explain the ball screw 100 in various states. Part (a) of FIG. 5 illustrates the screw axis 102 of the ball screw 100 in a state where no tension is applied thereto at an ordinary temperature. In this case, the screw axis 102 has a length0 as its natural length. Part (b) of FIG. 5 illustrates the ball screw 100 in a state where it is expanded in the longitudinal direction so as to have a length L1 greater than the length L0. The ball screw 100 is fixed by the first bracket 108 and the second bracket 110 in its expanded state. The illustrated table 106 is positioned at a distance L11 from the first bracket 108. A distance between the table 106 and the second bracket 110 is set as a distance L12.

Dashed lines drawn between parts (a) and (b) in the drawing represent relationships between the corresponding portions of the ball screw 100. For example, a portion of the ball screw 100 situated at a distance L11 from the first bracket 108 in part (b) corresponds to a portion situated at a distance L01 from the first bracket 108 in part (a). In other words, the distance L11 between the first bracket 108 and the table 106 in part (b) corresponds to the distance L01 in part (a). The distance L12 between the table 106 and the second bracket 110 in the state of the part (b) corresponds to a distance L02 in the state of the part (a).

In the state shown in part (b) of FIG. 5, tension uniformly acts on the screw axis 102 of the ball screw 100. Specifically, tension T11 acting on the ball screw 100 on the side of the first bracket 108 from the table 106 is equal to tension T12 acting on the ball screw 100 on the side of the second bracket 110. Accordingly, the following Formula (1) is satisfied:

$$T11=T12=E\times\{(L1-L0)/L0\}\times A0 \qquad \text{[Formula (1)]},$$

where the character E represents Young's modulus, and the character A0 represents cross sectional area of the screw axis 102.

The case where torque for accelerating or decelerating the table 106 is applied to the servo motor 120 in the state of the part (b) of FIG. 5, in which the table 106 is at the distance L11 from the first bracket 108, will now be considered. In this case, force which moves the table 106 acts to stretch or contract the screw axis 102 of the ball screw 100. However, since both ends 102a and 102b of the screw axis 102 are fixed in the longitudinal direction, the length L1 of the screw axis 102 remains unchanged. As a result, part of the screw axis 102 stretches in the longitudinal direction, while the other part of the screw axis 102 contracts in the longitudinal direction, in such a way that an amount of stretch and an amount of contraction in the local parts of the screw axis 102 cancel out each other, as a whole.

Part (c) of FIG. 5 illustrates a state in which the screw axis 102 stretches or contracts when torque for accelerating the table 106 toward the first bracket 108 is applied thereto. In the state shown in part (c), the table 106 is displaced to a position at a distance L21 from the first bracket 108, as a result of the stretch of the screw axis 102. Among a distance L22 defined between the table 106 and the second bracket 110, tension T21 acting on the ball screw 100 on the side of the first bracket 108, and tension T22 acting on the ball screw 100 on the side of the second bracket 110, the following Formulae (2) to (5) are satisfied:

$$T21 = E \times \{(L21-L01)/L01\} \times A0 \quad \text{[Formula (2)]};$$

$$T22 = E \times \{(L22-L02)/L02\} \times A0 \quad \text{[Formula (3)]};$$

$$L21 + L22 = L1 \quad \text{[Formula (4)]; and}$$

$$T21 - T22 = F \quad \text{[Formula (5)]},$$

where the character F represents force acting so as to move the table 106 toward the first bracket 108.

By solving the above Formulae (2) to (5), the distances L21 and L22 and the tensions T21 and T22 can be obtained as in the following Formulae (6) to (9):

$$L21 = L11 + \{(L0 \times L11 \times L12)/L1^2\} \times F/(E \times A0) = L11 + \{(L01 \times L02)/L0\} \times F/(E \times A0) \quad \text{[Formula (6)]};$$

$$L22 = L12 - \{(L0 \times L11 \times L12)/L1^2\} \times F/(E \times A0) = L12 - \{(L01 \times L02)/L0\} \times F/(E \times A0) \quad \text{[Formula (7)]};$$

$$T21 = E \times A0 \times \{(L1-L0)/L0 + (L12/L1) \times F \quad \text{[Formula (8)]; and}$$

$$T22 = E \times A0 \times \{(L1-L0)/L0\} - (L11/L1) \times F \quad \text{[Formula (9)]}.$$

In relation to the tensions T11 and T12, the following Formula (10) is satisfied:

$$T11 = T12 = E \times \{(L1-L0)/L0\} \times A0 = E \times \{(L11-L01)/L01\} \times A0 = E \times \{(L12-L02)/L02\} \times A0 \quad \text{[Formula (10)]}.$$

Accordingly, the distances L11 and L12 can be obtained by the following Formulae (11) and (12) with the distances L01 and L02, respectively:

$$L11 = (L1/L0) \times L01 \quad \text{[Formula (11)]; and}$$

$$L12 = (L1/L0) \times L02 \quad \text{[Formula (12)]}.$$

Therefore, a difference between the distances L11 and L21, and a difference between the distances L12 and L22, each of which corresponds to an amount of changes in positions of the feed axis before and after the torque is applied to the servo motor 120 are obtained by Formulae (13) and (14), respectively, as follows:

$$L21 - L11 = \{(L0 \times L11 \times L12)/L1^2\}F/(E \times A0) = (L0/L1) \times \{(L1-L11)/L1\} \times \{F/(E \times A0)\} \times L11 \quad \text{[Formula (13)]; and}$$

$$L22 - L12 = -\{(L0 \times L11 \times L12)/L1^2\} \times F/(E \times A0) = -(L0/L1) \times \{(L1-L11)/L1\} \times \{F/(E \times A0)\} \times L11 \quad \text{[Formula (14)]}.$$

The force F can be calculated from the following Formula (15), provided that the torque T applied to the servo motor 120 and a reduction ratio of the power transmission unit between the servo motor 120 and the ball screw 100 are determined:

$$F = (2\pi/le) \times T \quad \text{[Formula (15)]},$$

where the character le represents a lead (a length of a pitch) of the threaded groove of the ball screw 100.

In accordance with the above Formula (13), an amount of position correction corresponding to the table 106 situated at the distance L11 from the first bracket 108 can be calculated. The amount of position correction is used to correct the position of the table 106, so that the table 106 can be positioned accurately even if pretension acts on the ball screw 100.

The case where tension T22 acting on the side of the second bracket 110 is negative, i.e., the case where the tension T22 acts on the ball screw in a direction that contracts the ball screw 100 will now be considered. In this case, the end 102b of the screw axis 102 of the ball screw 100 protrudes from the second bracket 110. Accordingly, in this state, the end 102b of the screw axis 102 on the side of the second bracket 110 is a free end. Thus, tension acting on the ball screw 100 does not need to be taken into account for the purpose of calculation of an amount of stretch or contraction of the ball screw 100. An amount of position correction in this case can be determined by Formula (16), depending on the distance from the first bracket 108 to the table 106 as follows:

$$L21 - L11 = L11 \times \{F/(E \times A0)\} \quad \text{[Formula (16)]}.$$

Based on Formula (9), the condition under which the tension T22 is negative is met when the following inequality is satisfied:

$$F > E \times A0 \times (L1-L0)/L01.$$

Next, the case where thermal expansion of the ball screw 100 is taken into account will be described. If a length of the screw axis 102 of the ball screw 100 at an ordinary temperature t0 [° C.] is L0, a length Lt1 of the screw axis 102 at a temperature t1 [° C.] can be obtained by the following Formula (17):

$$Lt1 = L0 \times \{1 + \alpha \times (t1-t0)\} \quad \text{[Formula (17)]},$$

where the character α represents a linear expansion coefficient.

In the case where the temperature of the ball screw 100 rises up to the temperature t1 [° C.], and the length L0 is stretched to the length Lt1 without tension acting thereon being taken into account, an influence of thermal expansion of the ball screw 100 can be compensated by substituting Lt1 for L0. If the length L0 is replaced with the length Lt1, since an inequality Lt1>L0 is satisfied, threshold F which determines whether the tension T22 becomes negative will be smaller. On the other hand, when the length Lt1 of the ball screw 100 at the temperature t1 [° C.] becomes greater than the distance L1 between the first bracket 108 and the second bracket 110, the tension force acting on the ball screw 100 becomes zero. Based on this observation, the distance L1 is determined so as to correspond to a length of the ball screw 100 when a temperature rises from an ordinary temperature by to the tune of 2 to 3 degrees. This allows the tension to remain acting on the ball screw 100, even when the ball screw 100 thermally expands to some extent.

Figure 1:
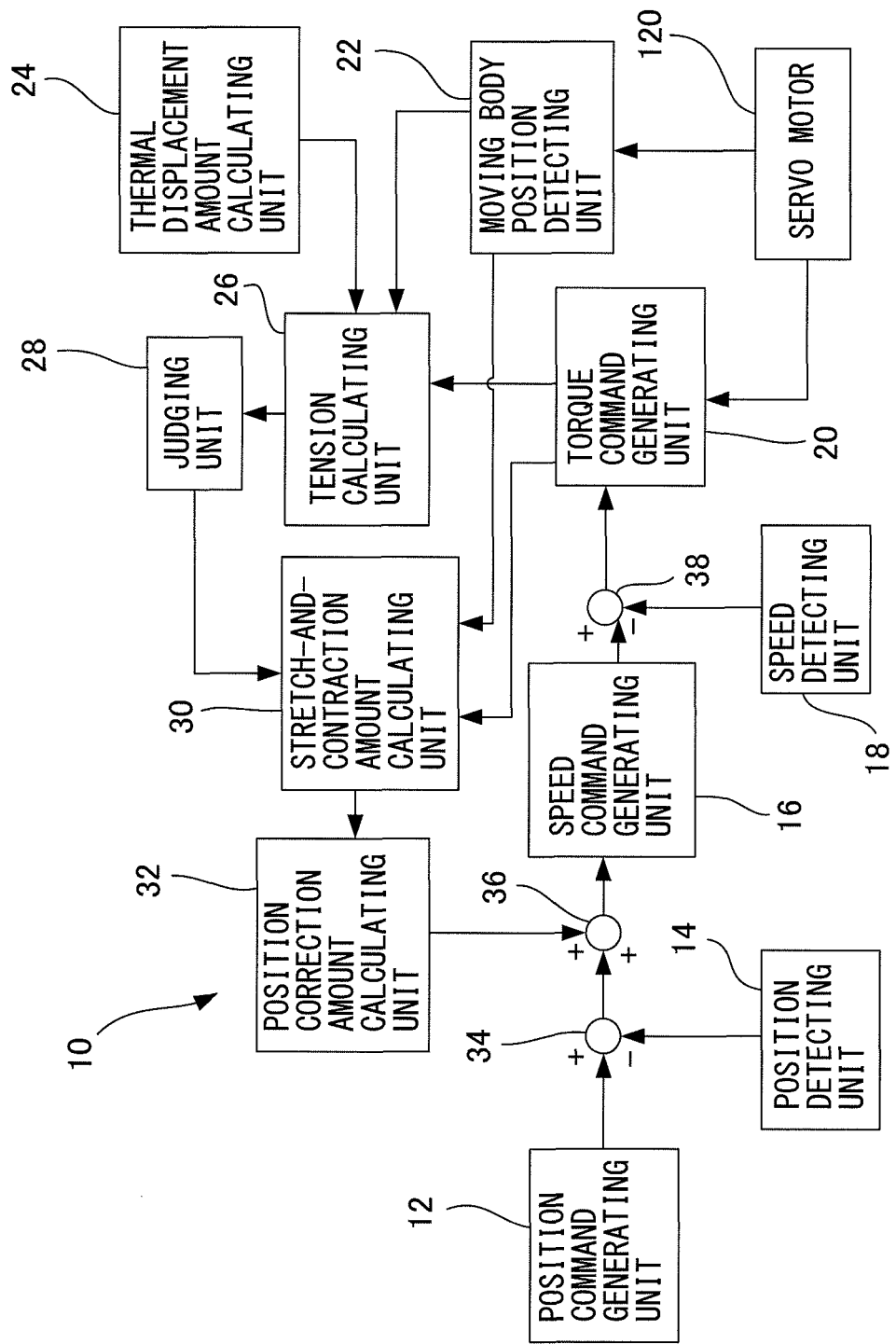
FIG. 1 is a block diagram showing a configuration of a servo control device according to one embodiment of the present invention.

The servo control device 10 for controlling the servo motor 120 will be described in detail. FIG. 1 is a block diagram showing a configuration of the servo control device 10 according to one embodiment of the present invention. The servo control device 10 includes a position command generating unit 12, a position detecting unit 14, a speed command generating unit 16, a speed detecting unit 18, a torque command generating unit 20, a moving body position detecting unit 22, a thermal displacement amount calculating unit 24, a tension calculating unit 26, a judging unit 28, a stretch/contraction amount calculating unit 30, and a position correction amount calculating unit 32. The servo control device 10 further includes a first subtractor 34 for subtracting an output value of the position detecting unit 14 from an output value of the position command generating unit 12, an adder 36 for adding an output value of the first subtractor 34 and an output value of the position correction amount calculating unit 32, and a second subtractor 38 for subtracting an output value of the speed detecting unit 18 from an output value of the speed command generating unit 16.

The position command generating unit 12 generates a position command based on a control program read out by the servo control device 10, for example, and outputs the position command for the servo motor 120 to the first subtractor 34. The position command for the servo motor 120 is determined in accordance with a relationship between an angular position of the servo motor 120 and a corresponding position of the feed axis of the ball screw 100, which is a target position for the control. The relationship between the angular position of the servo motor 120 and the position of the feed axis can be obtained based on mechanical configurations of the servo motor 120 and the ball screw 100. The position detecting unit 14 obtains an angular position of the servo motor 120 detected by an encoder 122 associated with the servo motor 120. The detected angular position is fed back to the first subtractor 34. The first subtractor 34 calculates an amount of position deviation which is a difference between the position command and the detected position. The result of calculation by the first subtractor 34 is output to the adder 36. The adder 36 adds an output value of the position correction amount calculating unit 32 to the output value of the first subtractor 34 and outputs the resultant value to the speed command generating unit 16.

The speed command generating unit 16 generates a speed command based on the amount of position deviation and an amount of position correction. The speed command for the servo motor 120 is output to the second subtractor 38. The speed detecting unit 18 obtains a speed of the servo motor 120 detected by the encoder 122, and feeds it back to the second subtractor 38. The second subtractor 38 calculates an amount of speed deviation based on the speed command and the detected value of speed associated with the servo motor 120. The second subtractor 38 outputs the calculated value to the torque command generating unit 20. The torque command generating unit 20 generates a torque command for the servo motor 120 based on the amount of speed deviation, and outputs the torque command to the servo motor 120. In accordance with the torque command, an electric current is supplied to the servo motor 120, thereby driving the servo motor 120. As a result, the table 106 is linearly moved via the ball screw 100. In the illustrated embodiment, position feedback control and speed feedback control is performed for the servo motor 120. However, the present invention is not limited to such a specific embodiment. For example, the servo control device 10 may be configured such that feedback control is performed in relation to a position of the feed axis in the ball screw 100 in order to indirectly control the servo motor 120. In this case, based on an amount of deviation between a position command for the feed axis and a detected position of the feed axis, a torque command to be given to the servo motor 120 is determined. Accordingly, in relation to the present invention, a "position command associated with a position of the feed axis" may be either a position command for the feed axis, or a position command based on which a position of the feed axis can be indirectly determined (such as the position command for the servo motor 120 as described above).

The moving body position detecting unit 22 detects a position of the table 106, and outputs the detected information on the position to the tension calculating unit 26 and to the stretch/contraction amount calculating unit 30, respectively. The position of the table 106 can be obtained from, for example, an angular position of the servo motor 120. Alternatively, the position of the table 106 may also be detected by a position sensor (not shown) that directly detects a position of the table 106. The thermal displacement amount calculating unit 24 approximately calculates an amount of thermal displacement of the feed axis in the ball screw 100, based on, for example, an operational condition of the servo motor 120. For example, an amount of thermal displacement of the feed axis of the ball screw 100 can be calculated based on an average speed of the servo motor 120 during a predetermined sampling period. The value of the amount of thermal displacement calculated by the thermal displacement amount calculating unit 24 is output to the tension calculating unit 26.

The tension calculating unit 26 calculates tension T>acting on the ball screw 100 on the side of the second bracket 110, based on a distance L1 from the first bracket 108 to the second bracket 110, a distance L11 from the first bracket 108 to the table 106, an amount of thermal displacement calculated by the thermal displacement amount calculating unit 24, and a torque command generated by the torque command generating unit 20. The tension T22 is calculated in accordance with Formula (9) as described above. A value of the tension T22 calculated by the tension calculating unit 26 is output to the judging unit 28. The judging unit 28 determines whether or not the tension T22 is positive, i.e., whether or not the tension T22 acts in a direction that stretches the ball screw 100 in the longitudinal direction. The result of judgment by the judging unit 28 is output to the stretch/contraction amount calculating unit 30.

Figure 2:
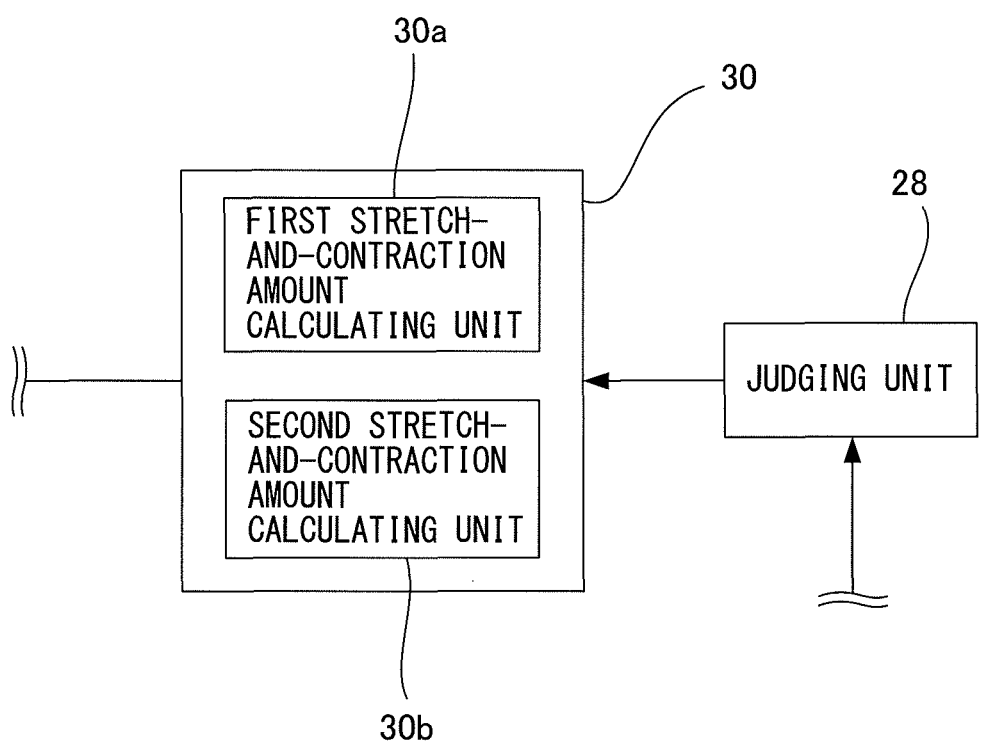
FIG. 2 is a block diagram showing a detailed configuration of a stretch/contraction amount calculating unit in FIG. 1.

The stretch/contraction amount calculating unit 30 further includes a first stretch/contraction amount calculating unit 30a and a second stretch/contraction amount calculating unit 30b, as illustrated in FIG. 2, in which a more detailed configuration of the stretch/contraction amount calculating unit 30 is shown. The stretch/contraction amount calculating unit 30 is configured so as to selectively activate either the first stretch/contraction amount calculating unit 30a or the second stretch/contraction amount calculating unit 30b, based on the result of judgment by the judging unit 28. Specifically, when the judging unit 28 determines that the tension T22 is positive, i.e., the tension T22 acts in a direction that stretches the ball screw 100, the first stretch/contraction amount calculating unit 30a calculates an amount of stretch of the ball screw 100, based on the distance L11 from the first bracket 108 to the table 106, the distance L1 from the first bracket 108 to the second bracket 110, and the torque command generated by the torque command generating unit 20. The first stretch/contraction amount calculating unit 30a calculates the amount of stretch of the ball screw 100 in accordance with the above-described Formula (13).

On the other hand, when the judging unit 28 determines that the tension T22 is negative, i.e., the tension T22 acts in a direction that contracts the ball screw 100, the second stretch/contraction amount calculating unit 30b calculates an amount of contraction of the ball screw 100, based on the distance L11 from the first bracket 108 to the table 106, and the torque command generated by the torque command generating unit 20. The second stretch/contraction amount calculating unit 30b calculates the amount of contraction of the ball screw 100 in accordance with the above-described Formula (16).

The amount of stretch or contraction calculated by the stretch/contraction amount calculating unit 30 is output to the position correction amount calculating unit 32. The position correction amount calculating unit 32 calculates an amount of position correction, based on the amount of stretch or contraction of the ball screw 100 which has been obtained by taking into account an influence of pretension applied to the ball screw 100. The amount of position correction is intended to correct a position command for the servo motor 120 associated with a position command for the feed axis. The calculated amount of position correction is output to the adder 36 by the position correction amount calculating unit 32.

Figure 3:
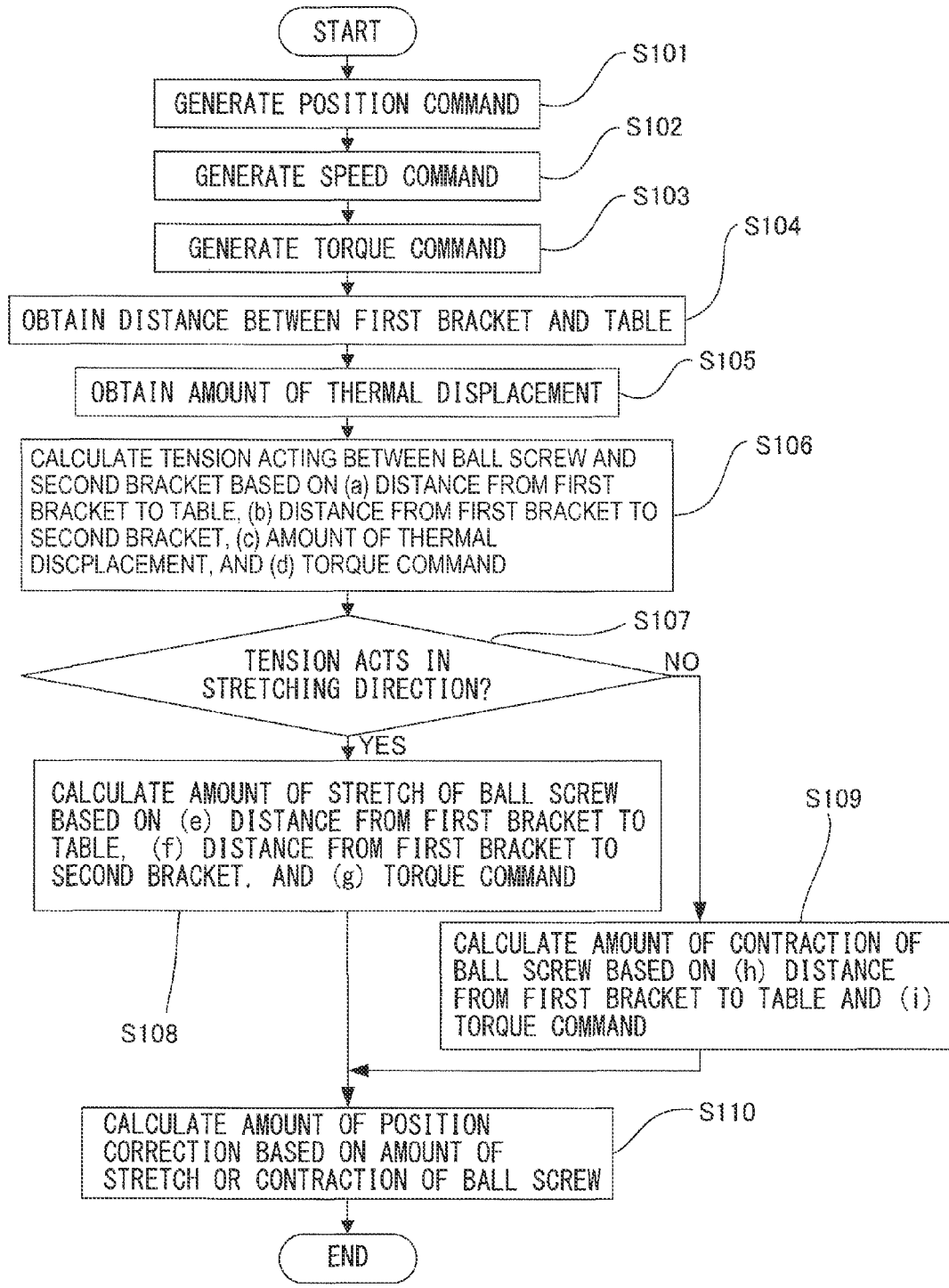
FIG. 3 is a flowchart showing a process performed by the servo control device according to the embodiment of the present invention.

Referring to FIG. 3, a process performed by the servo control device according to the present embodiment will be described. FIG. 3 is a flowchart showing the process performed by the servo control device.

Upon a command signal, e.g., a signal for positioning the table 106 at a predetermined position, being received by the servo control device 10, the position command generating unit 12 is activated to generate a position command for the servo motor 120 (step S101). Based on the position command output from the position command generating unit 12, and a detected position value output from the position detecting unit 14, a speed command for the servo motor 120 is generated by the speed command generating unit 16 (step S102). Then, based on the speed command output from the speed command generating unit 16, and a detected speed value output from the speed detecting unit 18, a torque command for the servo motor 120 is generated by the torque command generating unit 20 (step S103). The above process at steps S101 through S103 may be a general process carried out in order to control the servo motor 120.

Subsequently, a distance L11 between the first bracket 108 situated closer to the servo motor 120 and the table 106 is obtained, based on the detected information by the moving body position detecting unit 22 (step S104). A position of the table 106 can be obtained by using a detected value of the encoder 122 associated with the servo motor 120, or by using a position sensor that detects a position of the table 106, as described above. Further, an amount of thermal displacement of the ball screw 100 is calculated by the thermal displacement amount calculating unit 24 (step S105). The amount of thermal displacement calculated at step S105 is approximately calculated, e.g., by taking into account an operational condition of the servo motor 120.

Then, tension T22 applied to the ball screw 100 on the side of the second bracket 110 situated farther from the servo motor 120 is calculated by the tension calculating unit 26 (step S106). The tension calculating unit 26 calculates the tension T22 in accordance with Formula (9), based on: (a) the distance L11 from the first bracket 108 to the table 106; (b) the distance L1 from the first bracket 108 to the second bracket 110; (c) the amount of thermal displacement calculated by the thermal displacement amount calculating unit 24; and (d) force F calculated from the torque command in accordance with Formula (15). In this process, the length L0 in the state where no tension is applied to the ball screw 100 is replaced with a value that is adjusted based on the amount of thermal displacement calculated by the thermal displacement amount calculating unit 24.

Subsequently, based on the tension T22 calculated by the tension calculating unit 26, a direction in which the tension T22 acts on the ball screw 100 is determined. In other words, the judging unit 28 determines whether or not the tension T22 acts in a direction that stretches the ball screw 100 (step S107).

When it is determined at step S107 that the tension T22 acts in a stretching direction that stretches the ball screw 100, the process proceeds to step S108, and an amount of stretch of the ball screw 100 is calculated by the stretch/contraction amount calculating unit 30. Specifically, the first stretch/contraction amount calculating unit 30a of the stretch/contraction amount calculating unit 30 calculates an amount of stretch of the ball screw 100 in accordance with Formula (13), based on: (e) the distance L11 from the first bracket 108 to the table 106; (f) the distance L1 from the first bracket 108 to the second bracket 110; and (g) the force F calculated in accordance with Formula (15) using the torque command generated by the torque command generating unit 20 (step S108).

When it is determined at step S107 that the tension T22 acts in a direction opposite to the stretching direction, the process proceeds to step S109, and an amount of contraction of the ball screw 100 is calculated by the stretch/contraction amount calculating unit 30. Specifically, the second stretch/contraction amount calculating unit 30b of the stretch/contraction amount calculating unit 30 calculates an amount of contraction amount of the ball screw 100 in accordance with Formula (16), based on: (h) the distance L11 from the first bracket 108 to the table 106, and (i) the force F calculated in accordance with Formula (15) by using the torque command generated by the torque command generating unit 20 (step S109).

An amount of position correction for the feed axis of the ball screw 100 is then calculated by the position correction amount calculating unit 32, based on the amount of stretch or contraction of the ball screw 100 calculated at step S108 or step S109 (step S110). The amount of position correction calculated at step S110 is output to the adder 36 where it is incorporated into an amount of position deviation which represents an error between the position command for the servo motor 120 and the detected position.

In this way, according to the servo control device 10 of the present embodiment, an amount of stretch or contraction of the ball screw 100 is calculated by taking into account the tension acting on the ball screw 100. This allows the feed axis of the ball screw 100 to be positioned more accurately. When the ball screw 100 is in acceleration or deceleration, the amount of stretch or contraction of the ball screw 100 varies, depending on the tension acting on the ball screw 100. According to the present embodiment, even in such a case, a position of the ball screw 100 will be corrected. Further, it is also possible to correct a position of the feed axis of the ball screw 100 even when the amount of stretch or contraction amount of the ball screw 100 is locally different, depending on distances between the servo motor 120 and the moving body (table 106). Furthermore, according to the present embodiment, a position of the feed axis of the ball screw 100 can be corrected any time when the ball screw 100 is in acceleration or in deceleration.

EFFECT OF THE INVENTION

With the servo control device according to the present invention, an amount of stretch or contraction of the ball screw is calculated by taking into account an influence of tension acting on the ball screw. Accordingly, an error in positioning of the feed axis due to the tension acting on the ball screw can be prevented from occurring.

The various embodiments of the present invention are described above. However, it is apparent for a person skilled in the art that the present invention can be embodied by arbitrarily combining features of the embodiments disclosed explicitly or implicitly in the present specification. Although the invention has been shown and described with exemplary embodiments thereof, it should be understood by a person skilled in the art that the foregoing and various other changes, omissions and additions may be made therein and thereto without departing from the spirit and scope of the invention.

What is claimed is:

1. A servo control device for controlling a feed axis which converts rotational motion of a servo motor into linear motion of a moving body by way of a ball screw,
   wherein the ball screw is supported at opposite ends thereof by a first fixed unit arranged at one end of the ball screw closer to the servo motor, and by a second fixed unit arranged at the other end of the ball screw, respectively,
   the servo control device comprising:
   a position command generating unit for generating a position command associated with a position of the feed axis;
   a torque command generating unit for generating a torque command for the servo motor;
   a thermal displacement amount calculating unit for calculating an amount of thermal displacement of the ball screw;
   a tension calculating unit for calculating tension acting between the ball screw and the second fixed unit, based on a distance from the first fixed unit to the second fixed unit, a distance from the first fixed unit to the moving body, the amount of thermal displacement calculated by the thermal displacement amount calculating unit, and the torque command generated by the torque command generating unit;
   a stretch/contraction amount calculating unit for calculating an amount of locally-generated stretch or contraction of the ball screw during operation of the servo motor, based on the tension calculated by the tension calculating unit, the distance from the first fixed unit to the second fixed unit, the distance from the first fixed unit to the moving body, and the torque command generated by the torque command generating unit; and
   a position correction amount calculating unit for calculating an amount of position correction adapted to correct the position command associated with a position of the feed axis, based on the amount of locally-generated stretch or contraction calculated by the stretch/contraction amount calculating unit.

2. The servo control device according to claim 1, further comprising a judging unit for determining whether the tension calculated by the tension calculating unit acts in a stretching direction that stretches the ball screw, or in a contracting direction that contracts the ball screw,
   wherein the stretch/contraction amount calculating unit further comprises:
   a first stretch/contraction amount calculating unit for calculating an amount of locally-generated stretch of the ball screw, based on the distance from the first fixed unit to the moving body, the distance from the first fixed unit to the second fixed unit, and the torque command generated by the torque command generating unit, when the judging unit determines that the tension acts in the stretching direction; and
   a second stretch/contraction amount calculating unit for calculating an amount of locally-generated contraction of the ball screw, based on the distance from the first fixed unit to the moving body, and the torque command generated by the torque command generating unit, when the judging unit determines that the tension acts in the contracting direction.

3. The servo control device according to claim 2, wherein the first stretch/contraction amount calculating unit is configured to calculate the amount of locally-generated stretch of the ball screw by multiplying, with a predetermined constant, a product of:
   the distance from the first fixed unit to the moving body;
   a distance from the first fixed unit to the second fixed unit;
   an added distance obtained by adding a value of the amount of thermal displacement calculated by the thermal displacement amount calculating unit to an entire length of the ball screw at an ordinary temperature; and
   the torque command generated by the torque command generating unit.

4. The servo control device according to claim 2, wherein the second stretch/contraction amount calculating unit is configured to calculate the amount of locally-generated contraction of the ball screw by multiplying, with a predetermined constant, a product of:
   the distance from the first fixed unit to the moving body; and
   the torque command generated by the torque command generating unit.

5. The servo control device according to claim 1, wherein the distance from the first fixed unit to the second fixed unit is greater than an entire length of the ball screw at an ordinary temperature, and
   wherein the ball screw is fixed by the first fixed unit and the second fixed unit such that the ball screw is deformable in a direction that stretches the ball screw, while the ball screw is not deformable in a direction that contracts the ball screw.

6. The servo control device according to claim 1, wherein the thermal displacement amount calculating unit is configured to calculate the amount of thermal displacement of the ball screw, based on an average speed during a unit time.

* * * * *